(12) United States Patent
Strasser

(10) Patent No.: US 7,117,904 B2
(45) Date of Patent: Oct. 10, 2006

(54) DEVICE FOR MEASURING THE LEVEL OF A FUEL TANK

(75) Inventor: Ralf Strasser, Olching (DE)

(73) Assignee: Bayerische Motoren Werke AG, Munich (DE)

( * ) Notice: Subject to any disclaimer, the term of this patent is extended or adjusted under 35 U.S.C. 154(b) by 0 days.

(21) Appl. No.: 11/248,179

(22) Filed: Oct. 13, 2005

(65) Prior Publication Data
US 2006/0027284 A1 Feb. 9, 2006

Related U.S. Application Data

(63) Continuation of application No. PCT/EP04/03107, filed on Mar. 24, 2004.

(30) Foreign Application Priority Data
Apr. 17, 2003 (DE) ................. 103 17 672

(51) Int. Cl.
B65B 1/30 (2006.01)
(52) U.S. Cl. .............. 141/95; 141/1; 141/83; 141/94; 73/290 R
(58) Field of Classification Search ............ 141/1, 141/2, 18, 82, 83, 94, 95; 73/290 R, 295
See application file for complete search history.

(56) References Cited

U.S. PATENT DOCUMENTS 2,928,037 A * 3/1960 Lawrence .................. 307/117
6,213,170 B1 4/2001 Burke et al.
6,263,916 B1 7/2001 Rumpf
6,546,796 B1 * 4/2003 Zimmermann et al. ....... 73/295

FOREIGN PATENT DOCUMENTS

| DE | 199 00 378 A1 | 7/2000 |
| DE | 199 01 814 A1 | 7/2000 |
| DE | 100 63 201 A | 7/2002 |
| EP | 0 106 012 A | 4/1984 |
| EP | 1 020 714 A | 7/2000 |

OTHER PUBLICATIONS

International Search Report No. PCT/EP2004/003107, dated Jun. 22, 2004.
German Search Report No. 103 17 672.1, dated Mar. 10, 2004.

* cited by examiner

Primary Examiner—Timothy L. Maust
(74) Attorney, Agent, or Firm—Crowell & Moring LLP

(57) ABSTRACT

A device for measuring the filling level of a fuel tank, in particular for motor vehicles, having two openings for installation of a filling connection and a pump unit, and a film sensor provided with an electric connecting cable which can be connected to a display device through the pump unit. The film sensor is embedded in a protective tube which is provided with inlet openings for the fuel. The protective tube is mounted on the filling connection at the side and can be inserted jointly with it into the respective opening in the fuel tank.

14 Claims, 1 Drawing Sheet

DEVICE FOR MEASURING THE LEVEL OF A FUEL TANK

This application is a continuation of International Application No. PCT/EP2004/003107, filed Mar. 24, 2004 and claims the priority of German Patent Application No. DE 103 17 672.1, filed Apr. 17, 2003, the disclosure of which is expressly incorporated by reference herein.

BACKGROUND AND SUMMARY OF THE INVENTION

The invention relates to a device for measuring the filling level of a fuel tank, in particular for motor vehicles. Specifically, the inventive device has two openings for installation of a filling connection and a pump unit.

The known devices for measuring the filling level of a fuel tank, in particular for motor vehicles, operate with a float which is arranged on the free end of a pivotably mounted lever or in an immersion tube. The height of the float can be determined by using electric contacts, for example, which are arranged in the path of movement of the flow and/or the lever. The float closes an electric circuit, the length of which changes with the height of the float. The height of the float and thus the filling level of the fuel tank are defined by the resistance of the circuit. These known sensor systems are installed as individual modules by means of a flange or on fuel pumps in the tank. Because of the size of the lever tank sensor and the path described by the float, an ideal arrangement of the lever tank sensor in the tank and its mounting are difficult to implement for reasons of space. Furthermore, the insertion of the lever tank sensor into the tank is complicated because of the compact design of the sensor. Since the lever tank sensor is mounted on the pump unit, a compromise must be made with regard to positioning. The immersion tube sensor is subject to the disadvantage that for reasons of space, its flange cannot be situated in the upper area of the tank. Therefore, the filling level of the tank above the flange of the immersion tube sensor cannot be determined. The lever tank sensor and the immersion tube sensor both have the disadvantage that their mechanism of operation is based on the movement of a float and a particular installation opening must be provided in the tank.

An object of the present invention is to create a generic measurement device which does not have any moving parts, is largely independent of the dimensional shape of the fuel tank and does not necessitate any additional installation opening.

A measurement device corresponding to these requirements is characterized according to this invention in that a film sensor is provided with an electric connecting cable which can be connected through the pump unit to a display device and the film sensor is embedded in a protective tube which is provided with inlet openings for the fuel, and the protective tube is mounted on the filling connection at the side and can be inserted jointly with it into the respective opening in the fuel tank.

The film sensor used as part of this invention is known per se. It is a film having an electric heating device arranged on the back side and a plurality of thermocouples, which are part of an electric circuit, arranged on the front side. When the thermocouples are heated by the electric heating device, they generate a voltage. Since the thermal conductivity of a liquid is much higher than that of air, the thermocouples immersed in the liquid will heat up less than the thermocouples surrounded by air. With a certain heating power of the electric heating device, the filling level of the liquid can therefore be deduced from the voltage generated by the totality of thermocouples.

With the inventive measurement device, the protective tube serves not only to protect the film sensor from mechanical damage but also imparts the measurement arrangement adequate rigidity so that the lower end of the film sensor can be arranged at the lowest point in the fuel tank. The protective tube is inserted jointly with the filling connection into the respective opening in the fuel tank, and the connecting cable is passed out of the fuel tank and through the pump unit. The inventive measurement device therefore does not necessitate any additional openings. Due to the fact that the protective tube is mounted on the filling connection at the side, there is no risk of it colliding with the gun nozzle during the process of filling the tank.

In an expedient embodiment of the invention, the connecting cable is connected by a plug connection to one or more electric lines embedded in the pump unit. After joint insertion of the filling connection and the protective tube together with the film sensor in the tank, the connecting cable can be led out of the tank at the side through the opening provided for the fuel pump and connected to the pump unit which is then inserted into the tank opening.

In the case of a split fuel tank such as that conventionally used with motorcycles, joint installation of the filling connection and the protective tube may pose problems. In this case, the upper end of the protective tube is connected in an articulated joint to the filling connection. This may be accomplished, for example, by the fact that the upper end of the protective tube is provided with a hook which is hung in a harness attached to the side of the filling connection.

If the position of the lower end of the protective tube is not defined by the dimensional shape of the fuel tank, it may be expedient to provide the lower end of the protective tube with fastening means for fastening same to the bottom of the fuel tank. To this end, a spring clamp may be provided at the lower end of the protective tube so that the spring clamp can be engaged in a non-positive manner with an engagement area provided on the bottom of the fuel tank.

The protective tube is preferably comprised of two half-shells which are locked together, forming a slot. Fuel can penetrate through the slot into the interior of the protective tube so that fuel flows around the film sensor up to the filling level of the tank.

Other objects, advantages and novel features of the present invention will become apparent from the following detailed description of the invention when considered in conjunction with the accompanying drawings.

DETAILED DESCRIPTION

Figure 1:
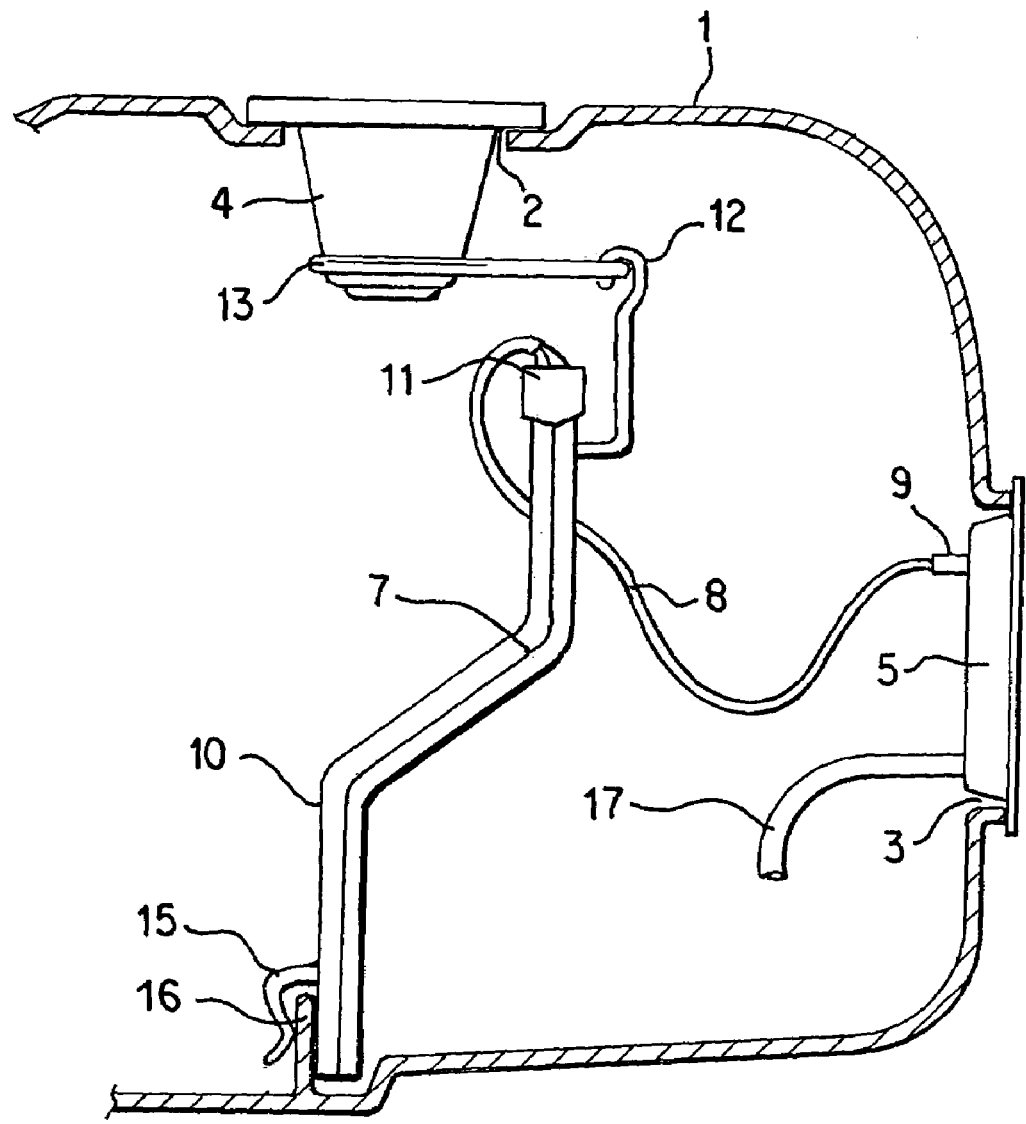
FIG. 1 shows schematically a vertical section through a fuel tank in the area of the filling connection and a pump unit with a fuel level sensor in accordance with an embodiment of the present invention.

FIG. 1 shows a fuel tank 1 is a hollow body made of plastic by a rotational molding or a blow molding method, having an upper opening 2 and a side opening 3. Filling connections 4 and a pump unit 5 can be inserted into the two openings 2 and 3 in a known way and secured there.

A so-called film sensor 7 is an essential component of device for measuring the filling level. The film sensor 7 is a strip-shaped carrier having a heating device extending over the entire length on one side and a plurality of electrically incorporated thermocouples on the other side. These thermocouples are part of an electric circuit in which a voltage can be built up. The upper end of the film sensor 7 is connected to a multi-core connecting cable 8. The free end of the connecting cable 8 is provided with a plug 9 which can be plugged into a corresponding socket on the pump unit 5. The pump unit 5 is connected by electric lines (not shown) to a voltage source for the heating device assigned to the film sensor 7 and to a measurement unit for displaying the voltage generated by the thermocouples situated on the sensor film. The film sensor 7 is embedded in a protective tube 10 made of a deformable material which serves, first, to protect the film sensor 7 from mechanical damage and, secondly, to reinforce the film sensor. The protective tube 10 consists of two half-shells which are joined together to form a slot. Fuel can penetrate through this slot into the protective tube 10 so that fuel flows around the film sensor 7. The upper ends of the protective tube 10 and the film sensor 7 and/or the connecting cable 8 are joined together with a cast-on piece 11 made of plastic. The cast-on piece 11 is provided with a hook 12 which can be suspended in a harness 13 attached to the side of the filling connection 4. The lower ends of the film sensor 7 and the protective tube 10 are connected to a cast-on piece 14 made of plastic which can be brought into form-fitting engagement with an engagement area situated at the bottom of the fuel tank 1. In the exemplary embodiment shown here, the cast-on piece 14 is provided with a laterally situated spring arm 15 protruding downward, and the bottom of the fuel tank 1 is provided with a rib 16 protruding upward.

Since the thermal conductivity of the fuel is much greater than that of air, the thermocouples with the fuel flowing around them heat up to a lesser extent than the thermocouples surrounded by air. Therefore, assuming a constant energy input to the heating device of the film sensor, the voltage generated by the totality of thermocouples can be used to calculate the ratio of the area of the film sensor 7 surrounded by fuel versus air. If the measurement device is calibrated, the voltage generated is a measure of the fuel filling level in the fuel tank.

The measurement device described above is installed as described below.

First the upper cast-on piece 11 of the protective tube 10 is suspended by its hook 12 in the harness 13 of the filling connection 4. Then the protective tube 10 together with the filling connection 4 is inserted through the upper opening 2 into the fuel tank 1. The mechanic can grip the protective tube 10 with his hand through the side opening 3 and can guide the lower cast-on piece 14 thereon into the specified position at the lowest point in the tank so that the cast-on piece 14 is in non-positive engagement with the rib 16, as illustrated in the drawing. Then the filling connection 4 can be attached to the fuel tank 1 in the usual manner. The connecting cable 8 of the film sensor 7 is then pulled out through the side opening 3 in the tank and its plug 9 is inserted into the pump unit 5, which is provided. The pump unit 5 is then inserted together with the respective pump line 17 into the side opening 3 in the fuel tank 1 and attached in the usual manner. The pump unit 5 is provided with connecting sockets (not shown) for the electric connection to an electricity source and/or to a measurement unit on the outside. The current source serves to supply the heating device that is integrated into the film sensor 7, and the measurement device serves to determine the voltage generated by the thermocouples integrated into the film sensor 7.

The protective tube 10 may be made of a deformable material, but it may also extend from the filling connection 4 to the lowest point in the tank in the case of a split fuel tank. This ensures that the filling level can be determined over almost the entire height of the full tank. The deformability of the fuel sensor 7 and/or the protective tube 10 makes it possible to attach the lower end at the lowest point in the fuel tank 1 and the upper end at the filling connection 4 even when they are offset horizontally with respect to one another. Therefore, the installation of the measurement device can be performed almost independently of the particular shape of the fuel tank.

If maintenance or replacement of the measurement device is necessary, it can be done easily by performing the assembly steps described above in the reverse order.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NOTATION 1 fuel tank
2 upper opening
3 side opening
4 filling connection
5 pump unit
7 film sensor
8 connecting cable
9 plug
10 protective tube
11 upper cast-on piece
12 hook
13 harness
14 lower cast-on piece
15 spring arm
16 rib
17 pump line

What is claimed is:

1. A device for measuring the filling level of a fuel tank having an opening for installation of a filling connection and an opening for installation of a pump unit, comprising:
   a film sensor;
   a protective tube protecting the film sensor;
   an electric connecting cable for connecting the film sensor to a level display system,
   wherein
      the protective tube is held at least at a mounting point adjacent to the filling connection opening, and
      the electric connecting cable is connected at one end to the film sensor and either passes out of the fuel tank through the pump unit opening or is connected to wires which pass out of the fuel tank through the pump unit opening.

2. The filling level measuring device as claimed in claim 1, wherein the protective tube is mounted on the filling connection.

3. The filling level measuring device as claimed in claim 1, wherein the connecting cable is connected by a plug connection to one or more electric lines embedded in the pump unit.

4. The filling level measuring device as claimed in claim 2, wherein an upper end of the protective tube is connected to the filling connection with an articulated joint.

5. The filling level measuring device as claimed in claim 4, wherein the articulated joint includes a hook provided at the upper end of the protective tube which cooperates with a flange at the side of the filling connection.

6. The filling level measuring device as claimed in claim 1, wherein a lower end of the protective tube is arranged to be held at a bottom of the fuel tank.

7. The filling level measuring device as claimed in claim 5, wherein a spring clamp is mounted on the lower end of the protective tube, the spring clamp being arranged to cooperate in non-positive engagement with an engagement area provided on the bottom of the fuel tank.

8. The filling level measuring device as claimed in claim 1, wherein the protective tube comprises two half-shells which, when locked together, form a film sensor support slot.

9. A fuel tank, comprising:
a tank body, said tank body having an opening for installation of a filling connection and an opening for installation of a pump unit;
a filling connection located at the filling connection opening;
a pump unit located at the pump unit opening;
a film sensor;
a protective tube protecting the film sensor;
an electric connecting cable for connecting the film sensor to a level display system,
wherein
the protective tube is held at least at a mounting point adjacent to the filling connection opening, and
the electric connecting cable is connected at one end to the film sensor and either passes out of the fuel tank through the pump unit opening or is connected to wires which pass out of the fuel tank through the pump unit opening.

10. A method of assembling a fuel tank having a filling level sensor, comprising the acts of:

providing a tank body, where said tank body includes an opening for installation of a filling connection and an opening for installation of a fuel pump unit;
providing a film sensor mounted on a protective tube, the protective tube being held at least at a mounting point adjacent to the filling connection opening;
providing an electric connecting cable for connecting the film sensor to a level display system, the electric connecting cable being connected at one end to the film sensor;
connecting an upper end of the protective tube to an outside portion of a filling connection;
inserting the connected protective tube and filling connection into the filling connection opening;
establishing an electric communication path through the fuel pump unit opening from the electric connecting cable to wires outside the fuel tank; and
inserting the fuel pump unit into the fuel pump unit opening.

11. The method of claim 10, wherein the electric communication path includes passage of the electric connecting cable through the fuel unit opening.

12. The method of claim 10, wherein the electric communication path includes a plug connection inside the fuel tank between the electric connecting cable and wires which extend through the fuel unit opening.

13. The method of claim 12, wherein the electric communication path wires are formed with the fuel pump unit, and the fuel pump unit closes off the fuel pump unit opening when the fuel pump unit is mounted in the opening.

14. The method of claim 10, further comprising the act of:
engaging a lower end of the protective tube with a corresponding surface at a bottom of the fuel tank.

* * * * *